US006883300B2

(12) United States Patent
Sanders

(10) Patent No.: US 6,883,300 B2
(45) Date of Patent: Apr. 26, 2005

(54) ASSEMBLY INCLUDING A CHAIN FOR SUSPENDING AN ARTICLE SUCH AS A LIGHT AND FOR CONCEALING AN ELECTRICAL CONDUCTOR

(76) Inventor: Allan Sanders, 75 Raglan Avenue, Toronto, Ontario (CA), M6C 2K7

( * ) Notice: Subject to any disclaimer, the term of this patent is extended or adjusted under 35 U.S.C. 154(b) by 0 days.

(21) Appl. No.: 10/617,179

(22) Filed: Jul. 11, 2003

(65) Prior Publication Data

US 2005/0005590 A1 Jan. 13, 2005

(51) Int. Cl.[7] ............................................. F16G 13/16
(52) U.S. Cl. ............................ 59/78.1; 59/900; 248/49
(58) Field of Search ................. 59/78.1, 900; 248/49, 248/51

(56) References Cited

U.S. PATENT DOCUMENTS

| | | | | | |
|---|---|---|---|---|---|
| 785,873 | A | * | 3/1905 | Goldman | 59/78.1 |
| 1,047,568 | A | * | 12/1912 | Riess | 59/78.1 |
| 1,098,779 | A | * | 6/1914 | Blake | 59/78.1 |
| 1,233,538 | A | * | 7/1917 | Alden | 59/78.1 |
| 1,394,575 | A | * | 10/1921 | Park | 59/78.1 |
| 1,550,683 | A | * | 8/1925 | Erikson | 59/78.1 |
| 1,686,362 | A | * | 10/1928 | Arras | 59/78.1 |
| 3,813,478 | A | * | 5/1974 | Ervin | 59/78.1 |

* cited by examiner

Primary Examiner—David Jones
(74) Attorney, Agent, or Firm—David J. French

(57) ABSTRACT

A chain for suspending an article, while concealing electrical conductors leading to the article, comprises a series of interlocking links, each link having a tubular portion through which a conductor can pass. Each link has an inlet aperture and an outlet aperture for the conductors, these apertures being located at opposite ends of the link, and both apertures being on the inside of the link. An outlet aperture at the lower end of an upper link underlies and registers with an inlet aperture at the upper end of the next lower link, so that a conductor can pass upwardly out of the outlet aperture of each upper link and into the inlet aperture of the next lower link without being exposed to view, the conductor then passing through the tubular portion of said next lower link to its outlet aperture and thence into a further lower link.

7 Claims, 12 Drawing Sheets

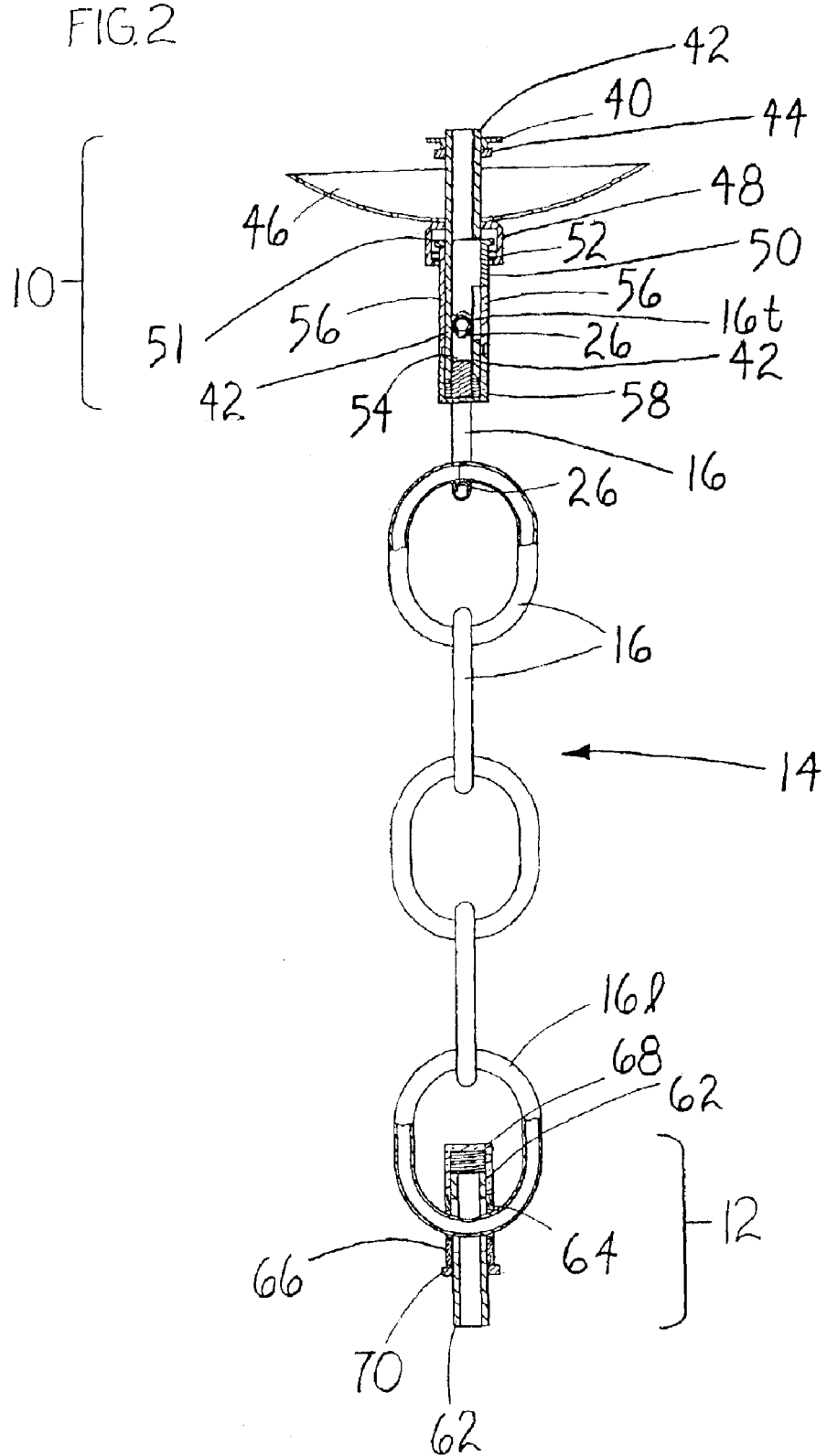

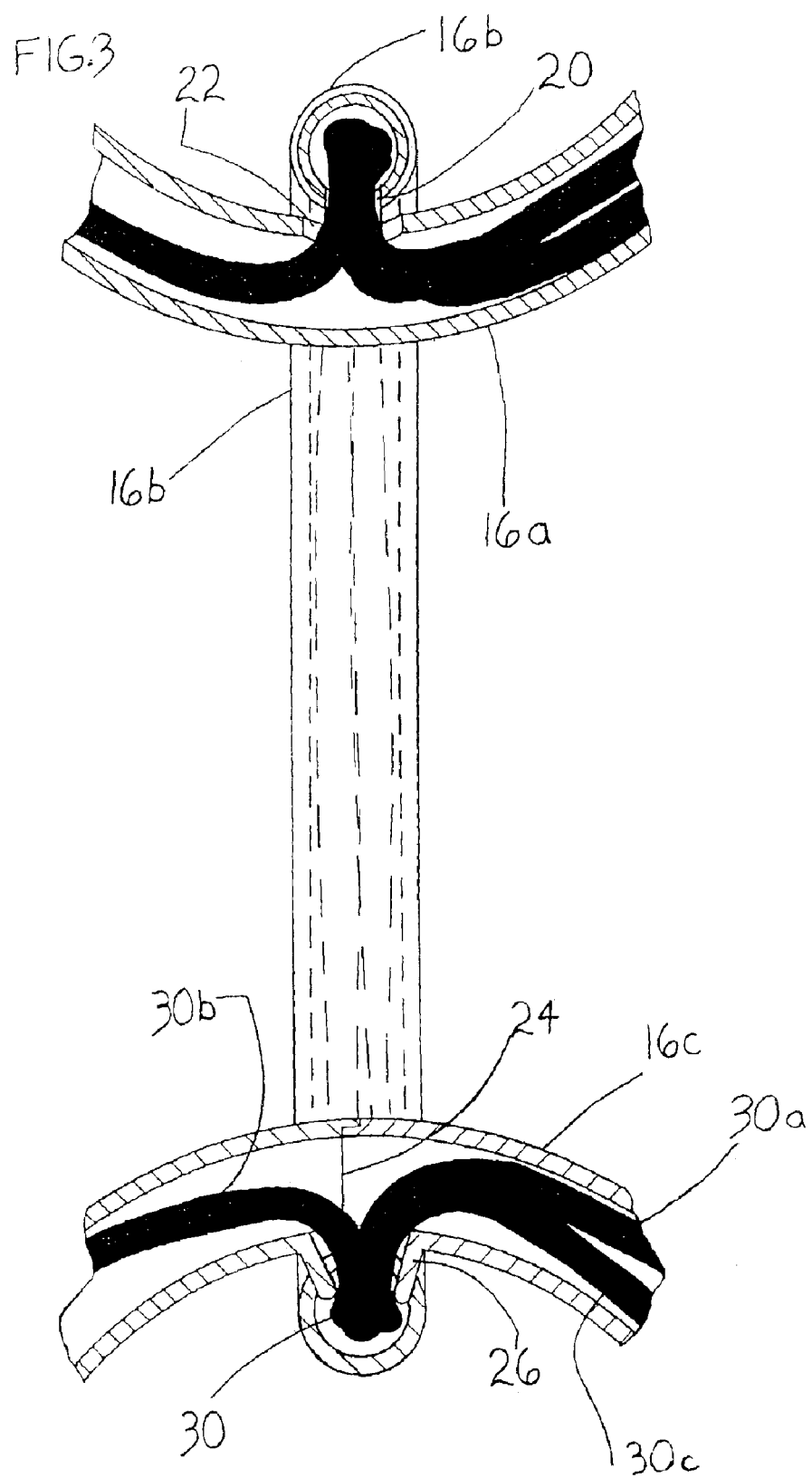

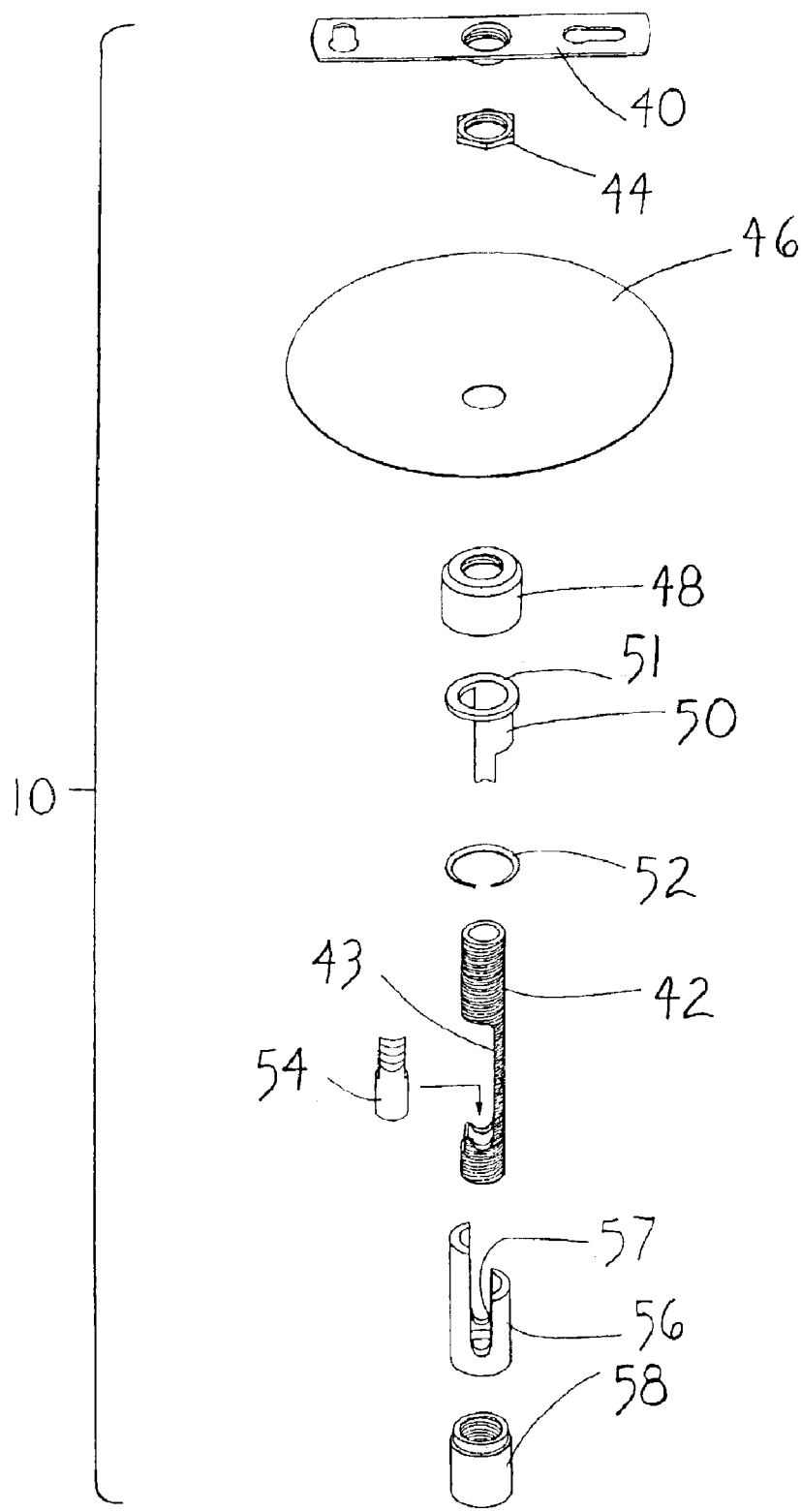

ASSEMBLY INCLUDING A CHAIN FOR SUSPENDING AN ARTICLE SUCH AS A LIGHT AND FOR CONCEALING AN ELECTRICAL CONDUCTOR

BACKGROUND OF THE INVENTION

1. Field of the Invention

The present invention relates to assemblies of the type having a chain, often of a decorative nature, used for suspending articles such as lighting fixtures, chandeliers, etc., requiring a supply of electricity.

2. Prior Art

It is common to suspend articles such as swag lamps, chandeliers or the like by decorative chains, and to provide the electrical supply to the article through cables which are wrapped around or are threaded through the links of the chain. Such arrangements generally have a somewhat untidy appearance.

Attempts have been made to devise chains which at least partly conceal the cables. Examples are shown in the following U.S. patents:

U.S. Pat. No. 1,098,779, issued Jun. 2, 1914 to Blake;
U.S. Pat. No. 1,233,538, issued Jul. 17, 1917 to Alden;
U.S. Pat. No. 1,686,362, issued Oct. 2, 1928 to Arras, and
U.S. Pat. No. 3,813,478, issued May 28, 1974 to Ervin.

Each of these patents shows a construction in which regular, simple chain links alternate with and connect special links which are hollow and carry the cable. In the Arras and Ervin constructions, portions of the cable are visible between the special hollow links so that the cable is not completely concealed. In Alden and Blake the special hollow links have end extensions which meet, or almost meet, together at the middle of the regular links, so that little if any of the cable will be visible; however this demands a rather special form of hollow links, and these do not closely resemble regular links of a chain.

SUMMARY OF THE INVENTION

The present invention provides a chain for a suspension assembly in which the links can be identical to each other, and can look the same as ordinary links of a chain, but in which the chain is capable of almost or completely concealing an electrical cable of the type normally needed for example, for an electric light.

In accordance with the present invention, there is provided a chain for suspending an article needing a supply of electricity, and for concealing electrical conductors leading to said article, comprising:

a series of interlocking links, each link having a tubular portion through which a conductor can pass through the length of the link, each link having an inlet aperture and an outlet aperture for the conductors, said inlet and outlet apertures being located at opposite ends of the link, and both apertures being on the inside surface of the link, the arrangement being such that, with the chain hanging vertically, an outlet aperture at the lower end of an upper link underlies and registers with an inlet aperture at the upper end of the next lower link, so that a conductor can pass upwardly out of the outlet aperture of each upper link and into the inlet aperture of the next lower link substantially without being exposed to view, the conductor then passing through the tubular portion of said next lower link to its outlet aperture and thence into a further lower link.

Preferably, projecting tabs are provided adjacent each inlet aperture, and these register in the sides of the outlet aperture of the next upper link.

In the preferred construction the links are all identical. Also, each link is split in the region of the inlet aperture, i.e. at the normal top of the link, and is sufficiently flexible to allow the ends provided by the split to be pulled apart for insertion of the conductor and for connection to the next upper link, the projecting tabs serving to hold said ends together, upon assembly of the chain, by their engagement with opposite sides of the outlet aperture of the next upper link.

Each link may be hollow throughout its length, so that the electrical conductors of a cable can pass separately down opposite sides of a link.

BRIEF DESCRIPTION OF THE DRAWINGS

A preferred embodiment of the invention will now be described by way of example with reference to the accompanying drawings, in which:

FIG. 2 is a view similar to FIG. 1 but with end fittings shown sectioned.

FIG. 3 is an enlarged sectioned view of a portion of the chain.

FIG. 4 is an exploded view of an upper end fitting for the assembly;

DETAILED DESCRIPTION

Figure 1:
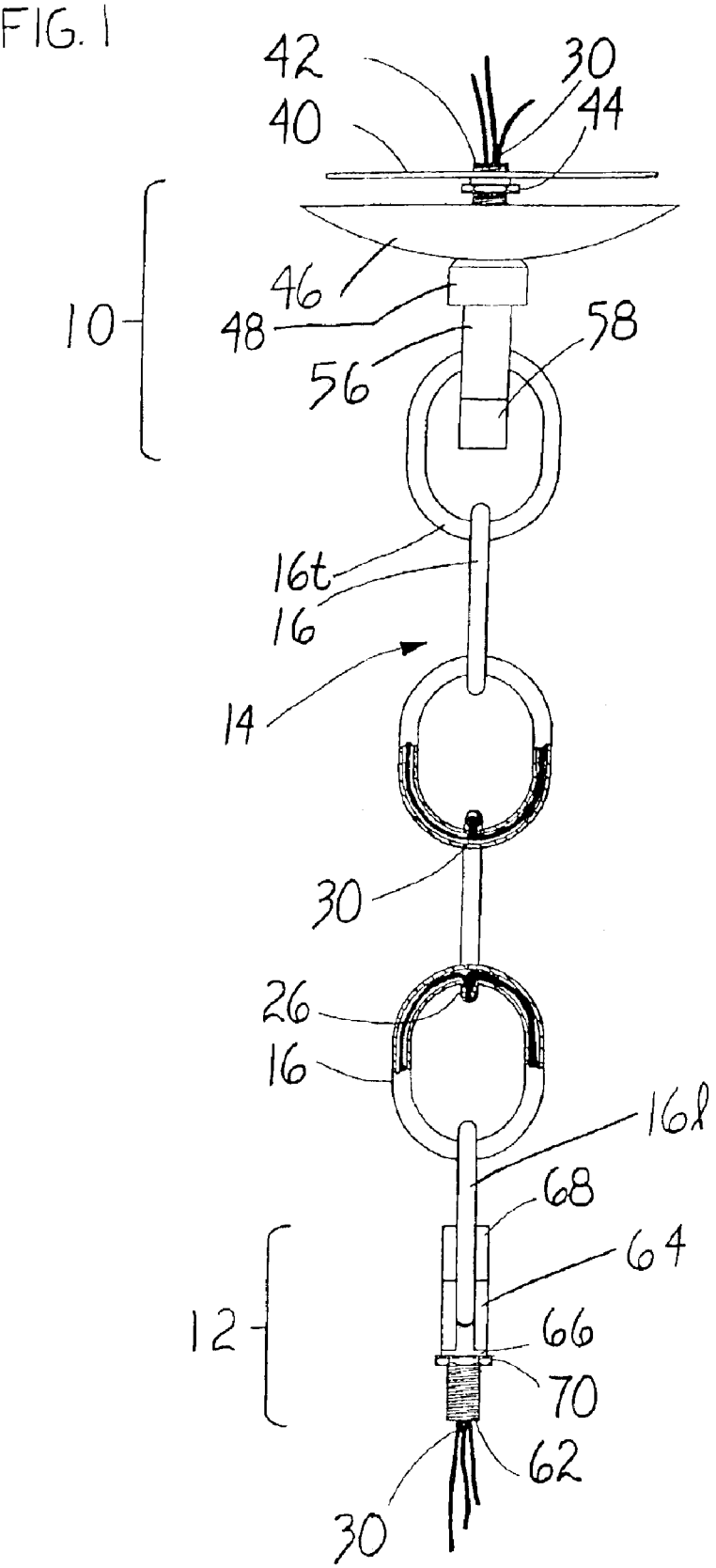
FIG. 1 is a partly sectioned elevation of the suspension assembly including a chain hanging vertically.
Figure 3A:
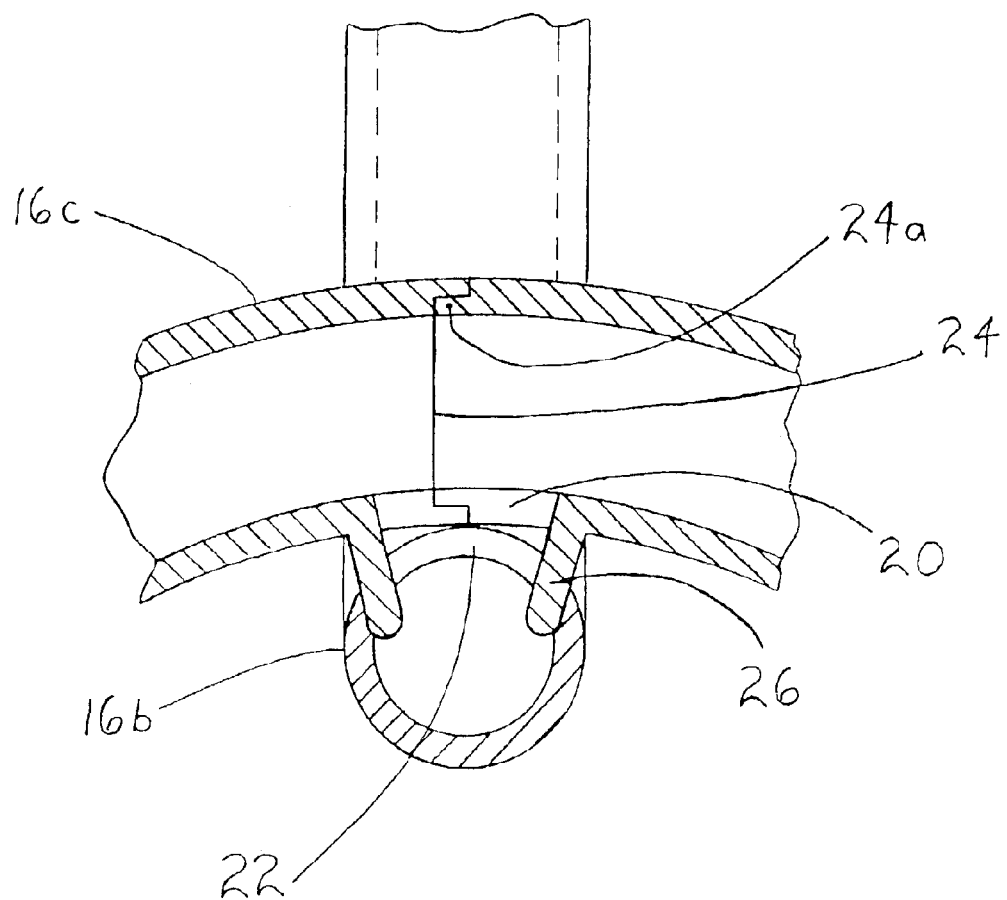
FIG. 3a is an enlarged portion of FIG. 3 but without the cable.
Figure 4A:
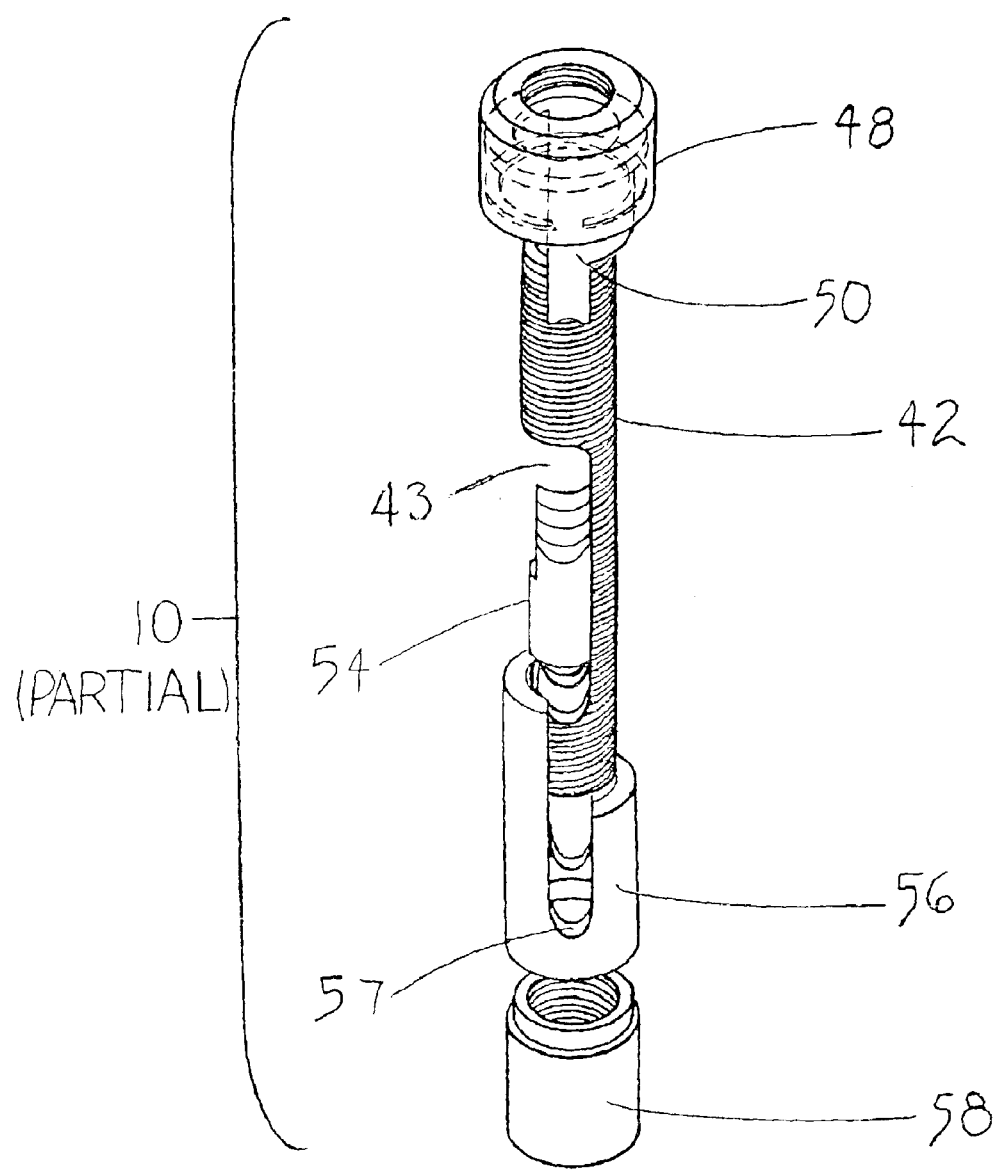
FIG. 4a is a view of some parts of the upper end fitting of FIG. 4 when partly assembled.
Figure 4B:
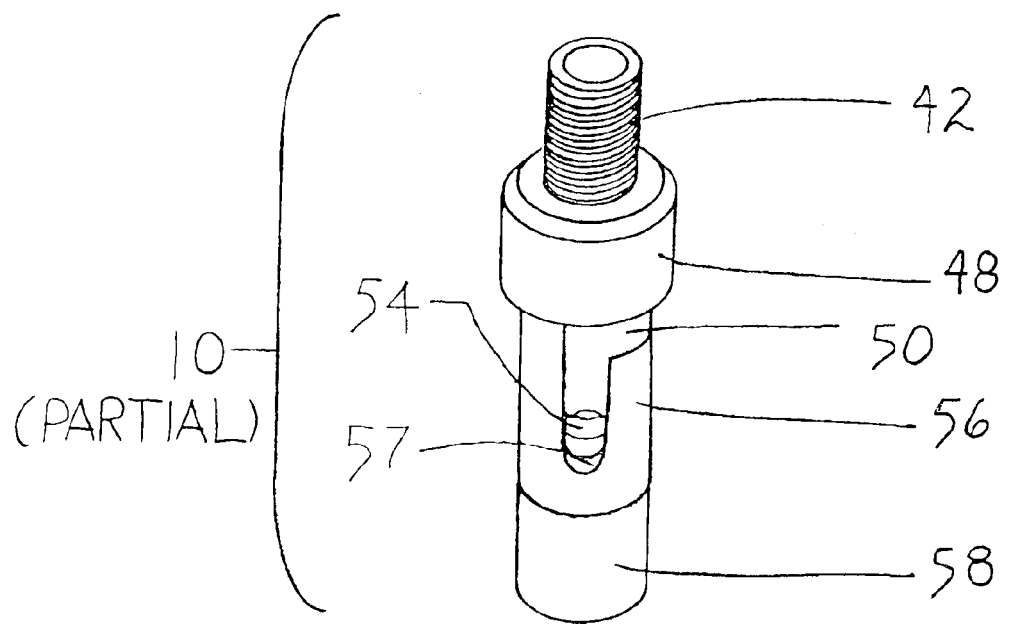
FIG. 4b is a view of the same parts of the upper end fitting when fully assembled.
Figure 5:
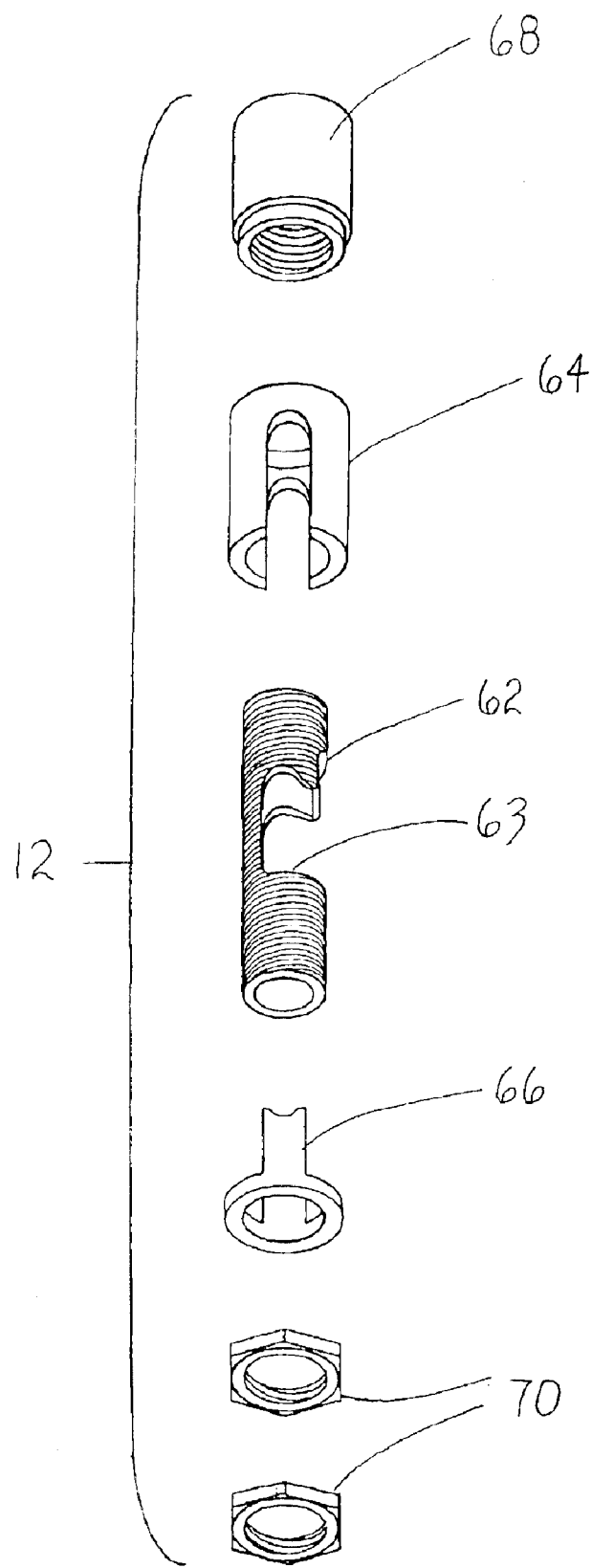
FIG. 5 is an exploded view of a lower end fitting of the suspension assembly.

Referring to FIGS. 1 to 3, the suspension assembly includes an upper end fitting 10 which will be described below with reference to FIGS. 4, 4a and 4b, a lower end fitting 12 which will be described below with reference to FIGS. 5, 5a and 5b, and a connecting chain 14 having a series of identical links 16. A representative portion of the chain shown in FIG. 3 has an upper link 16a, a next lower link 16b, and a further lower link 16c.

Each link 16 is formed from somewhat flexible metal tubing, which may be stainless steel or brass. In the vertically hanging orientation as shown, each link has an inlet aperture 20 on its inside surface at its upper end, suitable for receiving a cable inserted into the hollow interior of the tubing, and has a similar outlet aperture 22, also on its inside surface, at its lower end. The inlet and outlet apertures 20 and 22 of one link thus face each other across the center of the link. Each link is split at its upper center as shown at 24 in FIG. 3, and, as may be seen in the enlarged FIG. 3a, at the mating ends of the link one end of the tubing has a spigot 24a which registers within a rebate at the other end. The inlet aperture 20 is formed by matching recesses provided in the lower portions of these mating ends, and projecting from the sides of these recesses are tabs 26 which, upon assembly of the chain, engage the sides of the outlet aperture 22 of the next upper link as shown at the lower end of FIG. 3 and in FIG. 3a. These tabs 26 thus hold the ends of the links together when the chain is fully assembled.

Figure 6:
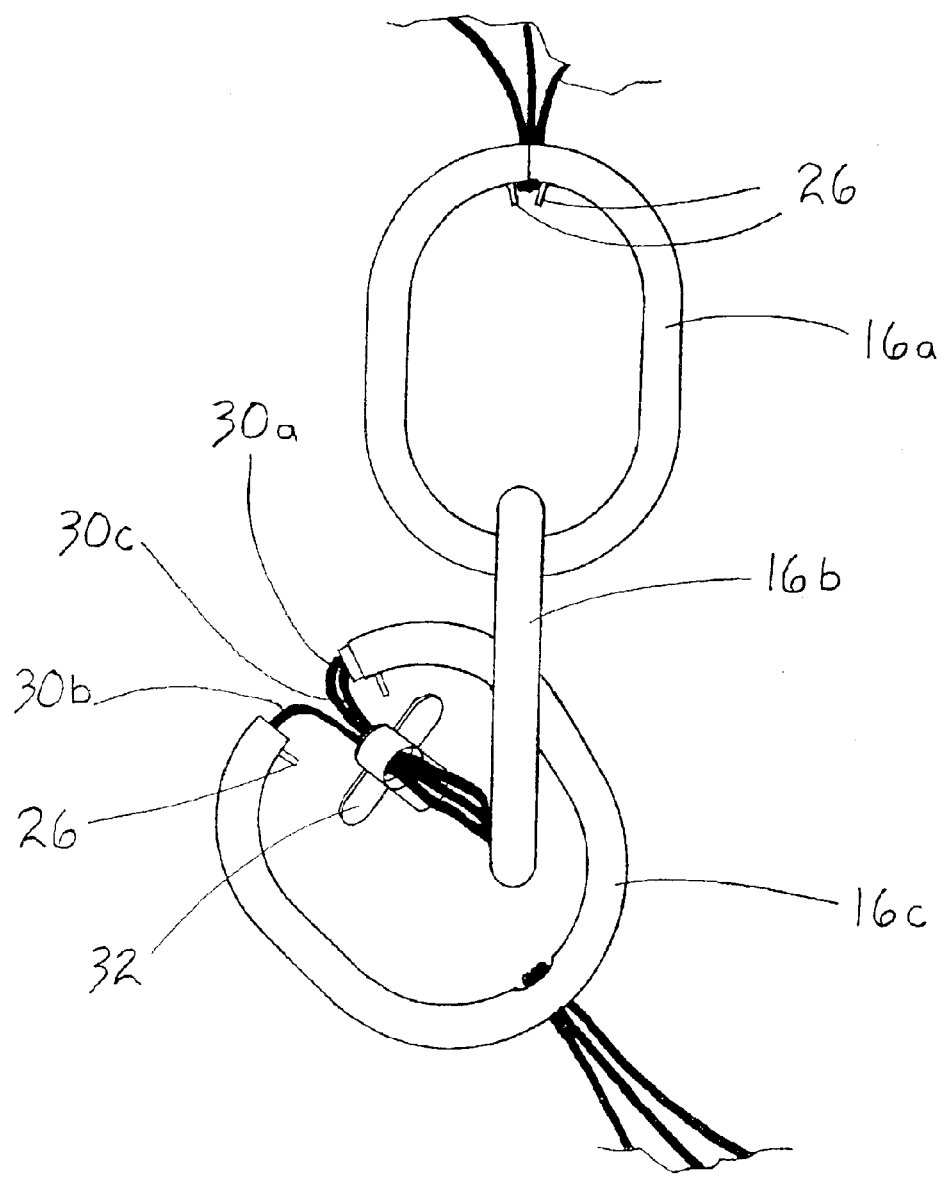
FIG. 6 is a view of several links in the chain in process of assembly.

As will be seen in FIGS. 1, 3 and 6, a cable 30, comprising a positive conductor 30a, a negative conductor 30b, and a neutral conductor 30c, can be threaded through the links during assembly of the chain. The positive and negative conductors can be separated as they pass through each link, as is illustrated in FIGS. 1 and 3, although this is not considered essential and it is also possible to keep all the conductors together.

Assembly of the chain is illustrated in FIG. 6, which shows a lower link 16c before attachment to a next upper link 16b. As shown, the link 16c is bent to separate its ends, with two conductors 30a and 30c being fed through one side of the link while the conductor 30b is fed through the other side of the link. As the conductors are pulled through, the mating ends of link 16c are fitted over the outlet aperture 22 of the link 16b and the tabs 26 are engaged with the sides of that aperture to hold the ends of the link 16c together.

Figure 7:
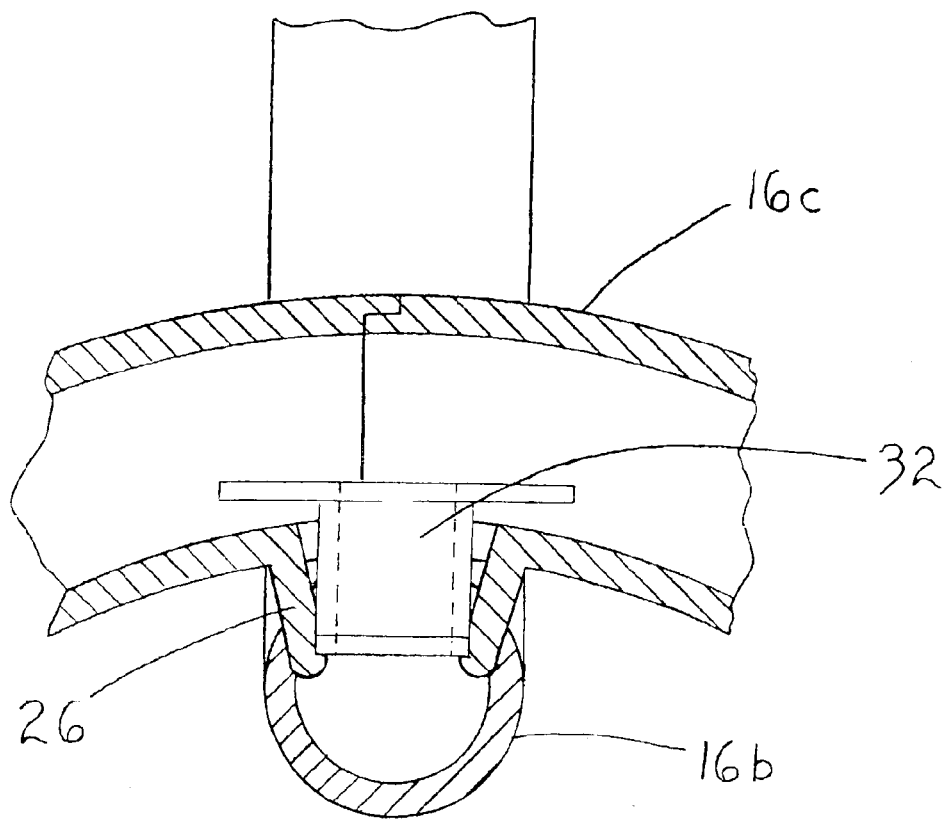
FIG. 7 is a view similar to that of FIG. 3a but with the addition of a grommet.

As shown in FIG. 6, an optional grommet part 32 formed of insulating vinyl plastic may be used to protect the conductors as they pass from one link to the other; the final position of this is illustrated in FIG. 7.

The top fitting 10, which is especially designed for guiding the conductive cable into the uppermost link of the chain, will now be described in relation to FIGS. 2 and 4, 4a and 4b.

As is common with fittings of this type, the top fitting 10 has a support strap 40 into which is threaded an externally threaded bushing 42 which extends the major length of the fitting; the bushing is secured to the strap 40 by locknut 44. As shown in FIG. 4, bushing 42 is similar to a conventional bushing used for light fixtures but has a recess 43 in one side to accommodate a top link 16t of the chain (shown in FIG. 2) and cable 30 leading to this link, as will be described below.

After the strap 40 has been secured with bushing 42, a cover plate 46 of conventional form is slid onto bushing 42 and secured by retainer nut 48 which also engages bushing 42. This retainer nut 48 is pre-assembled with an upper sleeve part 50 having an upper end flange 51 located in the hollow lower end of the nut 48, the sleeve part 50 being retained by a clip 52 which holds the flange 51.

The top fitting is then ready to accept the chain which has been pre-assembled with the cable 30 as described above. The top link 16t of the chain is placed in the recess 43, and then the cable 30 is fed into the top of recess 43 and out of the top of bushing 42. A shaped link support element 54 is then inserted into recess 43 and pushed down into the bottom of the bushing 42 to support the link 16t, and this element is held in place by a lower sleeve part 56 having slots 57 which accommodate the link 16t. This sleeve part 56 mates with the upper sleeve part 50 as shown in FIG. 2; part 50 also has a side cut away so that the sleeve parts when mated together accommodate both the link and the cable. The lower sleeve part 56 is in turn held in place by the lower retainer 58 which is threaded onto the lower end of bushing 42. FIGS. 4a and 4b show successive stages in the assembly of the parts 42, 48, 50, 56 and 58, but omit the link 16t shown in FIG. 2.

Figure 5A:
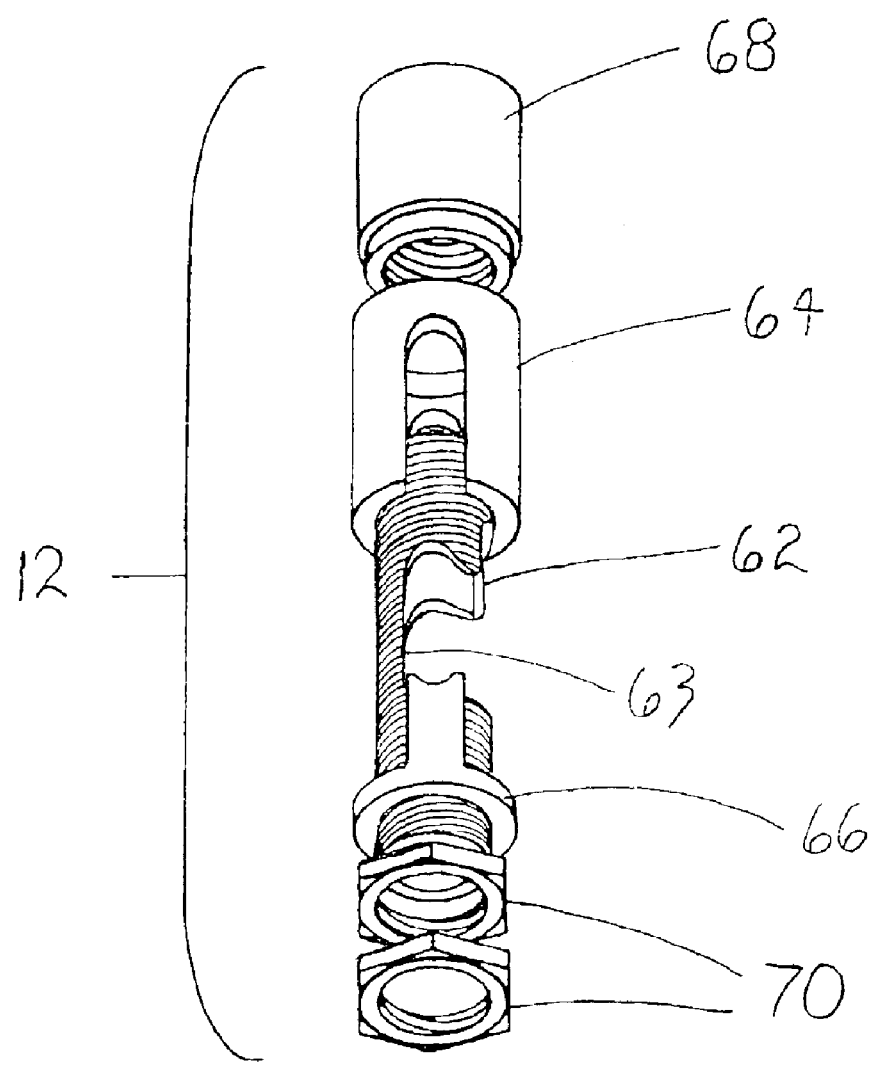
FIG. 5a is a view of the parts of the lower end fitting when partly assembled.
Figure 5B:
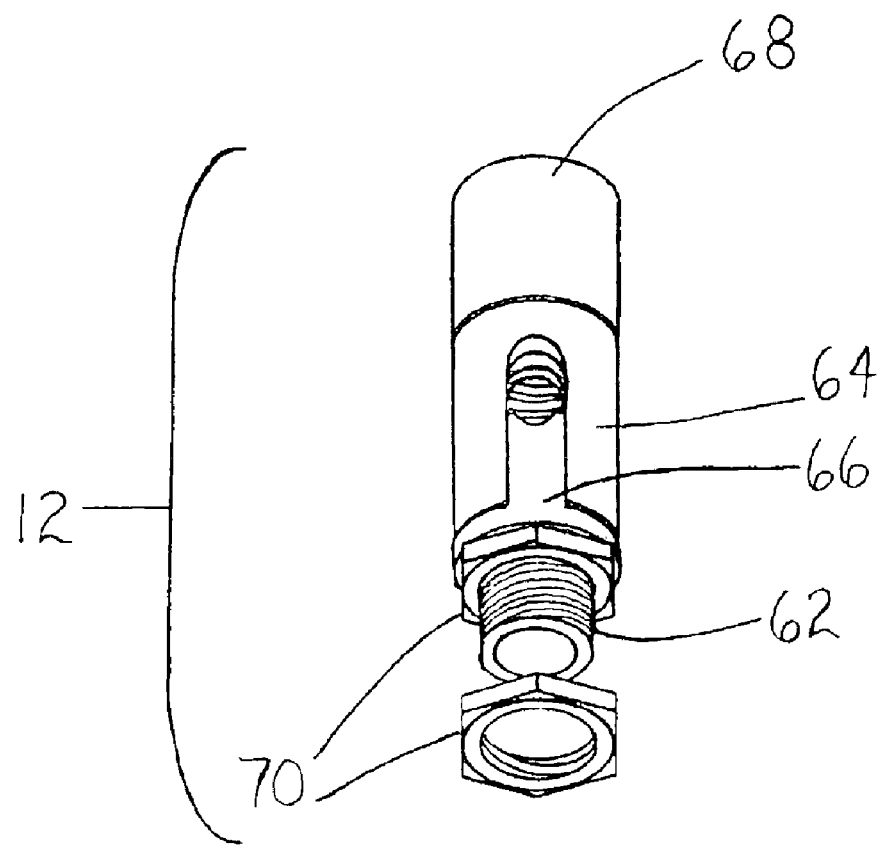
FIG. 5b is a view of the same parts of the lower end fitting when fully assembled.

The lower end fitting 12, shown in FIGS. 2, 5, 5a and 5b, has some parts which are similar to the upper end fitting, but which are inverted in position. Again, a bushing 62 is provided having a recess for the lowermost link 16l (shown in FIG. 2) and the cable 30, and this receives upper and lower sleeve parts 64 and 66 which, like parts 50 and 56, are designed to accommodate both the lowermost link 16l and the cable 30. The upper sleeve part 64 is held in place by a sleeve retainer 68 which threads onto bushing 62, and the lower sleeve part 66 is held in place by a lock nut 70 also threaded onto bushing 62. Again, the sleeve parts 64 and 66 when mated together accommodate both the end, bottom link 16l and the cable. Again, FIGS. 5a and 5b show successive stages in the assembly of the fitting, but omit the lowermost link 16l.

It will be seen that this invention provides a chain construction which completely, or almost completely, conceals a cable 30, while having the appearance of a regular chain, and in which all the links are identical. The links need not be oval as shown, but may be circular or of other shapes. If it is necessary to shorten the chain, this can easily be done by removing the lower fitting 12, lifting the lowermost link to release the tabs 26 from the next upper link, opening up the lowermost link and removing it from the chain while pulling out the cable. Links of the chain can also be removed from the top of the chain by a similar procedure at the top fitting. Lengthening the chain requires the reverse procedure.

I claim:

1. A chain for suspending an article needing a supply of electricity, and for concealing electrical conductors leading to said article, comprising a series of interlocking links including first and second links that are adjacent and mated to each other, each link having:
   a) an upper end and a lower end bounding a central opening surrounded by the link,
   b) an inside surface facing into said central opening,
   c) two outside surfaces positioned laterally on either side of said inside surface and directed outwardly from said central opening,
   d) a split in the link providing link ends,
   e) a tubular passageway through which a conductor can pass through the length of the link,
   f) an inlet aperture and an outlet aperture for the passage of the conductors, said inlet and outlet apertures being located at opposite ends of each link, both apertures being located on the inside surface of the link, spanning between the side surfaces of each link with at least one of said apertures spanning said split,
   g) dual tabs extending from the inside surface of each link towards said central opening, positioned adjacent each inlet aperture of said link, one on either side of said split to register with the outlet aperture of the next adjacent link and extend respectively along the sides of the adjacent link to which it is mated,
the arrangement of the chain being such that with the chain hanging vertically with the links mated to each other, an outlet aperture at the end of one link is in register with an inlet aperture at the end of the next adjacent link, so that a conductor can pass through the outlet aperture of one link, through the tubular passageway of said one link and through the inlet aperture of the adjacent link substantially without being exposed to view, said tabs serving to hold said link ends together, upon assembly of the chain, by their engagement with the outside sides of the adjacent link.

2. A chain according to claim 1, wherein each link of the chain is sufficiently flexible to allow the split to be pulled apart for insertion of the conductor and for connection to the next upper link.

3. A chain according to claim 2, wherein each link of the chain is identical.

4. A chain according to claim 1, wherein each link of the chain is hollow throughout its length, and whereby the electrical conductors of a cable can pass separately through opposite sides of a link.

5. A chain according to claim 2, wherein each link of the chain is hollow throughout its length, and whereby the electrical conductors of a cable can pass separately through opposite sides of a link.

6. A chain according to claim 3, wherein each link of the chain is hollow throughout its length, and whereby the electrical conductors of a cable can pass separately through opposite sides of a link.

7. A suspension assembly for suspending an article needing a supply of electricity, and for concealing electrical conductors leading to said article, said assembly including a chain according to claim 1, and further comprising:

a fitting for an end of the chain which includes a threaded bushing having a side recess capable of accommodating both an end link of the chain and cable leading to the adjacent aperture in said end link, and further comprising upper and lower sleeve parts arranged to mate together while accommodating both said end link and said cable.

* * * * *

UNITED STATES PATENT AND TRADEMARK OFFICE
CERTIFICATE OF CORRECTION

PATENT NO. : 6,883,300 B2
DATED : April 26, 2005
INVENTOR(S) : Allan Sanders

It is certified that error appears in the above-identified patent and that said Letters Patent is hereby corrected as shown below:

Column 2,
Line 59, after "16 is" insert -- preferably --;
Line 61, after "link" insert -- 16: --;
Line 61, after "has" insert:
-- a) an upper end and a lower end bounding a central opening surrounded by the link 16;
b) an inside surface facing into said central opening;
c) two outside sides positioned laterally on either side of said inside surface and directed outwardly from said central opening
d) a tubular portion within the link 16 serving as a passageway through which a conductor can pass through the length of the link 16,
e) an inlet aperture 20 and an outlet aperture 22 for the passage of the conductors, said inlet and outlet apertures 20, 22 being located at opposite ends of each link 16, both apertures being located on the inside surface of the link 16, spanning between the side surfaces of each link 16 with at least one of said apertures 20, 22 spanning said split, and
f) dual tabs 26 extending from the inside surface of each link 16 towards said central opening, positioned adjacent the inlet aperture 20 of said link 16, one on either side of said split to register with the outlet aperture 22 of the next adjacent link 16 and extend respectively along the sides of said adjacent link 16 to which it is mated,
the arrangement of the chain being such that with the chain hanging vertically with the links 16 mated to each other, an outlet aperture 22 at the end of one, upper link underlies and registers with an inlet aperture 20 at the end of the next adjacent, lower link 16, so that a conductor can pass through of the outlet aperture 22 of said upper link, through the tubular passageway portion of said one link and then through the inlet aperture 20 of the adjacent link 16 substantially without being exposed to view. --.
Line 61, delete "an" and insert -- The --;
Line 62, delete "on its" and insert -- formed on the --;
Line 62, after "surface" insert -- of each link --;
Line 62, delete "suitable" and insert -- is suitably dimensioned --;
Line 64, after "tubing, and" insert -- each link 16 --;
Line 67, after "the link" insert -- both apertures spanning between the side surfaces of each link --.

UNITED STATES PATENT AND TRADEMARK OFFICE
CERTIFICATE OF CORRECTION

PATENT NO. : 6,883,300 B2
DATED : April 26, 2005
INVENTOR(S) : Allan Sanders

It is certified that error appears in the above-identified patent and that said Letters Patent is hereby corrected as shown below:

Column 3,
Line 1, after "Fig.3" insert -- with at least one of said apertures spanning the split --;
Line 8, after "next" insert -- , mated, --;
Line 10, after "assembled" insert -- by their engagement with opposite sides of the adjacent link. --.

Signed and Sealed this

Twenty-eighth Day of February, 2006

JON W. DUDAS
*Director of the United States Patent and Trademark Office*